United States Patent
Cui

(10) Patent No.: US 10,311,232 B2
(45) Date of Patent: Jun. 4, 2019

(54) EMBEDDED SYSTEMS MONITORING SYSTEMS AND METHODS

(71) Applicant: Red Balloon Security, Inc., New York, NY (US)

(72) Inventor: Ang Cui, New York, NY (US)

(73) Assignee: RED BALLOON SECURITY, INC., New York, NY (US)

( * ) Notice: Subject to any disclaimer, the term of this patent is extended or adjusted under 35 U.S.C. 154(b) by 223 days.

(21) Appl. No.: 15/354,879

(22) Filed: Nov. 17, 2016

(65) Prior Publication Data
US 2017/0147814 A1 May 25, 2017

Related U.S. Application Data

(60) Provisional application No. 62/256,665, filed on Nov. 17, 2015.

(51) Int. Cl.
*G06F 21/55* (2013.01)
*G06F 21/57* (2013.01)

(52) U.S. Cl.
CPC ............ *G06F 21/554* (2013.01); *G06F 21/57* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 9,563,580 B2 * | 2/2017 | Warner | ................... G06F 13/10 |
| 2013/0298242 A1 | 11/2013 | Kumar | |
| 2014/0104103 A1 | 4/2014 | Enge | |
| 2015/0180581 A1 | 6/2015 | Steiner | |
| 2015/0188938 A1 | 7/2015 | Freeze-Skret | |

OTHER PUBLICATIONS

International Search Report and Written Opinion for PCT Application No. PCTUS2016054227 dated Jan. 5, 2017.

* cited by examiner

*Primary Examiner* — Christopher A Revak
(74) *Attorney, Agent, or Firm* — Sheppard, Mullin, Richter & Hampton LLP

(57) ABSTRACT

Methods and systems for detection and prevention of exploitation of embedded devices. A sensing component is configured to detect a plurality of emanated analog signals and generate one or more synchronization events. The synchronization events are used to perform one or more attestation analyzes, including execution attestation, integrity attestation, and control-flow reconstruction, the results of which may be used to generate security events.

18 Claims, 7 Drawing Sheets

```
while true:
    x = coinflip()
    blinkLED(x)       blinkLED(x)
    y = randint()     if x:
    sleep(y)              blinkRed()
                      else:
                          blinkBlue()
```

```
while true:
    x = coinflip()   ⬆ 90ns ± 3%
    blinkLED(x)      ⬆ 250ns ± 10%
    y = randint()    ⬆ 70ns ± 1%
    sleep(y)         ⬆ unknown
```

EMBEDDED SYSTEMS MONITORING SYSTEMS AND METHODS

CROSS-REFERENCE TO RELATED APPLICATIONS

This application claims the benefit of U.S. Provisional Application No. 62/256,665 filed Nov. 17, 2015, which is hereby incorporated herein by reference in its entirety.

TECHNICAL FIELD

The disclosed technology relates generally to security validation of computing devices, and more particularly, some embodiments relate to active integrity attestation of sensor input data.

DESCRIPTION OF THE RELATED ART

An embedded device is a special-purpose object with a dedicated function included within computing systems. The use of embedded devices is pervasive, with embedded devices being incorporated for many diverse purposes. Embedded systems are pervasive throughout both civilian and specialized (e.g., government; military; etc.) infrastructures. Traffic control systems, communication networks, automotive systems, weapons systems, aviation infrastructure, energy grids, medical devices, point of sale ("PoS") systems, access control systems, and the Internet are just a few of the environments where embedded devices are prevalent.

In recent years, the scale of attacks against embedded devices has grown from rare, nation-state sponsored intrusions to large criminal botnets solely comprising embedded systems on the open internet. Embedded and Mission Specific Devices ("EMSDs") face many constraints such as low computational resources, power usage limitations, intermittent connectivity, black box firmware without the ability to install additional software, low cost requirements, difficult upgrade process, and significant diversity. Many server and desktop security solutions are impracticable to deploy due to these constraints.

BRIEF SUMMARY OF EMBODIMENTS

Gaining visibility into the internal computational state of embedded devices and EMSDs is crucial to the creation of security solutions that detect and prevent the exploitation of embedded devices. According to various embodiments of the disclosed technology, methods and systems are provided for performing non-invasive real-time execution attestation and probabilistic control-flow reconstruction on modern commercial off the shelf ("COTS") embedded systems by monitoring a multitude of induced analog emanations caused by the execution of its software. Various embodiments unify the continuous collection of many modes of emanated signals from a protected device. The collected data may be processed to correlate all relevant signals into discrete synchronization events. These synchronization events may be tagged with high-resolution timestamps, and may be simultaneously consumed by one or more algorithms designed to attest to the execution of specific code structures and to perform best-effort reconstruction of the control-flow on the protected device. Various embodiments may be designed to work with embedded devices and EMSDs running unmodified firmware (i.e., the firmware as loaded by the manufacturer). In some embodiments, the fidelity and accuracy of the output of the methods and systems may be improved by strategically deploying software boosting mechanisms in both known firmware (i.e., where the source code is known) and unknown firmware (i.e., where access to the source code is limited or non-existent).

According to various embodiments of the disclosed technology, a system is provided comprising: a sensing component configured to detect a plurality of analog emanations; a synchronization event generator configured to generate one or more synchronization events based on one or more analog emanations detected by the sensing component; an event analysis and state estimation component configured to analyze one or more synchronization events generated by the synchronization event generator, and generate one or more attestation determinations; and a security event generator configured to generate one or more security events based on one or more attestation determinations outputted by the event analysis and state estimation component. The sensing component may include one or more of: single-mode sensors; multi-mode sensors; or a combination thereof.

According to various embodiments of the technology disclosed herein, a method of security protection of embedded devices is provided, comprising: detecting, by one or more sensors of a monitoring system, one or more analog emanations of an operating embedded device; generating one or more synchronization events by a synchronization event generator; identifying the one or more attestation determinations based on the one or more synchronization events; and generating one or more security events based on the one or more attestation determinations Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 4A shows an example program in accordance with various embodiments of the technology disclosed herein.

FIG. 4B shows an example temporal execution profile in accordance with various embodiments of the technology disclosed herein

Figure 1:
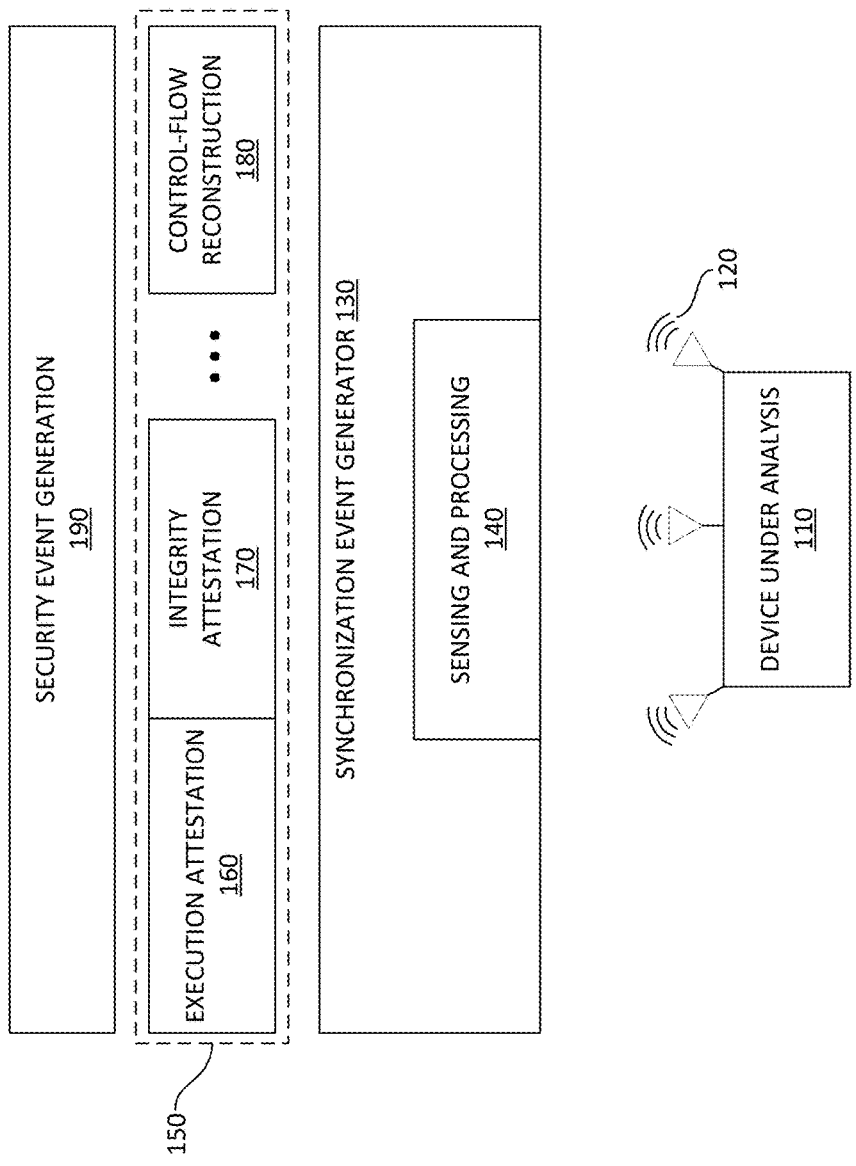
FIG. 1 is a high-level architecture of an example monitoring system in accordance with various embodiments of the technology disclosed herein.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments of the technology disclosed herein are directed toward devices and methods for providing security validation and/or integrity attestation of embedded devices and EMSDs. More particularly, the various embodiments of the technology disclosed herein utilizes the involuntary emission of analog signals by embedded devices combined with program analysis to determine the running state of the system, expanding upon offensive data exfiltration techniques to provide defensive methods. Embodiments of the technology disclosed herein provide a remote, non-invasive attestation channel that air-gaps the adversary. This air-gapped, high fidelity attestation channel allows the defender to leverage isolated, external systems with greater computational resources. By gaining visibility into the internal computational state of embedded systems, the technology disclosed herein allows the creation of more robust and beneficial security solutions that detect and prevent the exploitation of embedded devices. Various embodiments of the technology disclosed herein perform non-invasive real-time execution attestation and probabilistic control-flow reconstruction by monitoring a multitude of induced analog emanations caused by the execution of its software. The technology is applicable to commercial off the shelf ("COTS") embedded devices, as well as specifically designed embedded devices.

Embodiments of the technology disclosed herein unifies the continuous collection of many modes of emanated signals from the protected device. The collected data is processed in order to correlate all relevant signals into discrete synchronization events, which may be tagged with high-resolution timestamps and are simultaneously consumed by a collection of algorithms designed to attest to the execution of specific code structures and to perform best-effort reconstructions of the control-flow on the protected device. In various embodiments, the technology can be used with unmodified COTS firmware, whereas in other embodiments software boosting mechanisms may be deployed to improve the fidelity and accuracy of the output of the attestation system, both for known firmware and unknown firmware (i.e., limited access to the source code).

Embodiments of the technology disclosed herein are designed to account for the unique constraints of a wide spectrum of modern embedded systems, ranging from ultra-low-power mobile sensors to embedded systems controlling high-powered peripherals in industrial, environmental, and robotic platforms. Moreover, various embodiments are designed to leverage unique, advantageous characteristics of embedded devices, such as the unique analog emanation characteristics of embedded system circuitry and connected peripheral components. Deterministic and hard real-time portions of embedded firmware may be exploited to perform opportunistic control-flow reconstruction, through algorithms continuously refining probabilistic models of the control-flow of monitored embedded devices through simultaneous forward estimating and back-solving possible execution paths based on incoming synchronization events. In various embodiments, multi-modal sensing capabilities enable the bridging of the gap between the resolution of data needed to identify comprised executions and what can be realistically derived from observed emanations.

FIG. 1 is a high-level architecture of an example monitoring system 100 in accordance with various embodiments of the technology disclosed herein. As illustrated, the monitoring system 100 includes a device under analysis ("DUA") 110. The DUA 110 can be one or more embedded devices. Non-limiting examples of apparatus or systems that may be the device under test 110 include: cell phones; routers; voice over IP ("VOIP") endpoints; printers; PIC controlled motors; wearable electronic devices (e.g., smart watches; fitness monitors; etc.); PLC relay systems; autonomous vehicles; manufacturing and industrial machines; femto-cells; or appliances built for the Internet of Things; or any system including embedded devices. In various embodiments, the device under test 110 may include large scale systems such as smart buildings, industrial plants, or seaborne systems. In various embodiments, the DUA 110 may be a COTS device, where the embedded device firmware's source code may or may not be known. In some embodiments, the DUA 110 may have one or more incorporated security features with which the monitoring system 100 is capable of utilizing in its attestation and control-flow determinations. Purpose-built embedded devices may be the DUA 110 in various embodiments.

Figure 2:
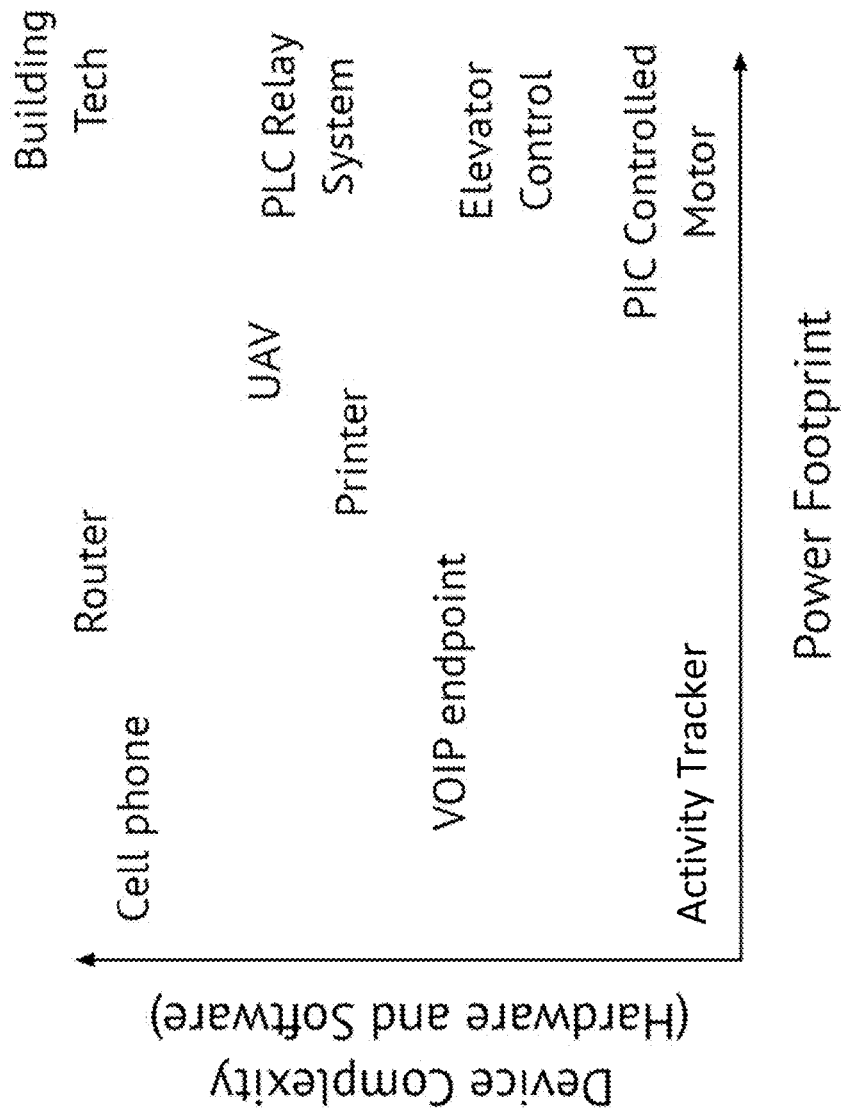
FIG. 2 illustrates a range of different devices under analysis charted by their complexity and power consumption.

In various embodiments, the DUA 110 may vary significantly. FIG. 2 illustrates a range of different DUAs 110 charted by their complexity and power consumption. With the wide range of power usage and complexity in DUAs, current platforms for attestation testing lack the flexibility to work with a wide range of different DUAs 110. Various embodiments of the technology disclosed herein, however, is applicable to a wide range of different DUAs 110 by leveraging emanations of embedded devices. Instead of being designed to monitor a particular type of DUA 110, the monitoring system 100 is designed to take advantage of the types of emanations generated by all DUAs 110 during operation.

Referring to FIG. 1, during operation, the DUA 110 gives off analog emanations 120. In various embodiments, the analog emanations 120 are unique based on the DUA 110 circuitry and connected peripheral components, as well as the internal execution state. In various embodiments, these analog emanations 120 may include, but are not limited to: electromagnetic radiation; acoustic vibrations; electric power variations; optical transmissions; and/or thermal energy; or other analog emanations which are generated during operation of embedded devices. These analog emanations 120 may be given off by a plurality of different components within the DUA 110. In some embodiments, the analog emanations 120 may be induced due to security and attestation artifacts injected into the firmware and/or hardware of the DUA 110.

In the monitoring system 100, the sensing and processing component 140 acts as an interface between the analog emanations 120 and the synchronization event generator 130. The synchronization event generator 130 of the monitoring system 100 utilizes the analog emanations to generate synchronization events. Synchronization events are indications that a particular function and/or operation of the DUA 110 was executed based on the one or more analog emanations 120 detected by the sensing and processing component 140. In various embodiments, the sensing and processing component 140 may include one or more sensors and/or other detection components configured to detect a multitude of different analog emanations 120 from the DUA 110. In various embodiments, the sensing and processing component 140 may include one or more single-mode sensors, a single-mode sensor being configured to detect one type of analog emanation. In other embodiments, one or more multi-mode sensors may be included in the sensing and processing component 140, a multi-mode sensor being configured to detect two or more types of analog emanations. In various embodiments, a combination of one or more single-mode sensors and one or more multi-mode sensors may be included within the sensing and processing component 140. sensing and processing component 140. In various embodiments, the sensing and processing component 140 may include a programmable system on chip ("SoC") configured to work with the one or more sensors and provide real-time processing of the data collected by the sensors. The sensing and processing component 140 translates the analog emanation data into digital data.

The synchronization event generator 130 takes the digital data from the sensing and processing component 140 and creates one or more synchronization events indicating that a particular function or action was executed. The synchronization event generator 130 synchronizes the detected analog emanations 120 with an operation or function of the DUA 110 to create a synchronization event. In various embodiments, a synchronization event may represent more than one operation or function of the DUA 110. Each synchronization event is tagged with one or more nanosecond time stamps, as well as descriptive metadata about the synchronization event.

Figure 3:
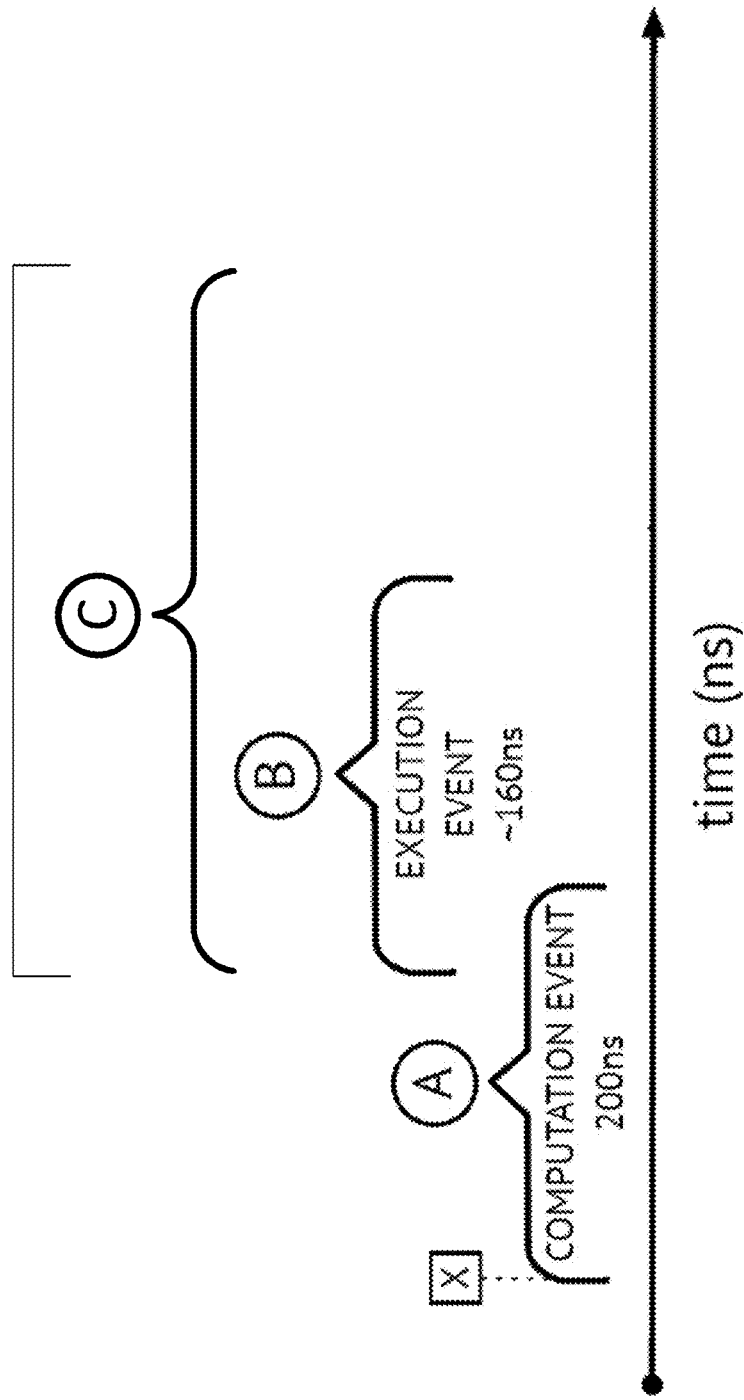
FIG. 3 is an example timeline illustrating multiple variable latencies involved in sensing and processing of emanated signals with respect to the example monitoring system discussed with respect to FIG. 1.

In some cases, the sensing and processing latency of the sensing processing component 140 may vary, due to hardware and/or software limitations of the DUA 110 and/or the hardware/software of the sensing processing component 140. FIG. 3 is an example timeline 300 illustrating multiple variable latencies involved in sensing and processing of emanated signals with respect to the example monitoring system 100 discussed with respect to FIG. 1. The illustrated example timeline 300 represents a timeline for a single computational event X. In various embodiments, X may be a single operation or function of the DUA 110, or a collection of operations or functions of the DUA 110. The computational event X computes on the DUA 110 for a period A. In the illustrated example, A spans 200 ns. In various embodiments, the period A may vary depending on the hardware and/or software of the DUA 110. At some point during A, an emanation event B begins. In the illustrated example, B lasts for 160 ns. In various embodiments, the period B may vary depending on the type of computational event. During B, the synchronization event generator 130 and sensing and processing component 140 begin to process the received data during processing period C. In various embodiments, processing period C may coincide with the beginning of period B. In other embodiments, processing period C may begin at some point within period B.

The processing period C will take an amount of time. In various embodiments, if the periods A, B, and C are deterministic, it is possible to reliably identify the start time of computational event X. Where the periods A, B, and C are not deterministic or are unknown, predicting the precise start and endpoint of computational event X is not possible. By reducing the processing latency of processing period C, the monitoring system 100 can be configured to increase the accuracy of probabilistic detection of the start time of computational event X. In various embodiments, processing latency may be addressed by utilizing a real-time operating system ("ROTS") environment, augment the synchronization event generator 130 with FPGA or DSP hardware, or a combination of both. Although a precise starting time of computational event X cannot be determined, a synchronization event identifying execution of X is generated by the synchronization event generator 130 for use by analysis modules of the monitoring system 100.

Referring back to FIG. 1, the synchronization events generated by the synchronization event generator 130 are used by the event analysis and state estimation ("EASE") component 150. The EASE component 150 consumes the synchronization events and operates a number of analyzer engines. In various embodiments, the EASE component 150 provides a large circular buffer or real-time state estimation data outputted by one or more analyzer engines for use by the security event generator 190. The EASE component 150 comprises one or more analysis engines, each configured to perform a number of analytical functions. In various embodiments, the two or more analysis engines could be combined into the same engine, enabling the same component to perform multiple analytical functions. Although the EASE component 150 is described with respect to three analysis engines (160, 170, 180), a person of ordinary skill in the art would appreciate that other analysis engines could be included to perform any type of analysis associated with the DUA 110. The EASE component 150 generates one or more attestation determinations.

In various embodiments, the EASE component 150 may include an execution attestation engine 160. The execution attestation engine 160 determines whether a specific block of code was executed. A basic block is a straight-line code sequence with no branches in (except for the entry) and no branches out (except for the exit). A function of the DUA 110 may comprise one or more basic blocks. The execution attestation engine 160 is used to confirm that the specific block of code has executed.

For ease of discussion, the operation of the execution attestation engine 160 and the other analysis engines of the EASE component 150 will be discussed with respect to an example program 410 shown in FIG. 4A, and an example temporal execution profile 420 of the program 410 shown in FIG. 4B. For this discussion, assume that the program 410 is the sole program executing on the DUA 110. The temporal execution profile 420 is a high resolution map of the amount of time it takes to execute a specific piece of code. A temporal execution profile is a collection of timing data describing how long components of code will take to execute on a specific processor. Each temporal execution profile can be created either through simulation or empirical profiling using macrocell tracing. The amount of a priori knowledge about each program will impact what is deducible about the computation of the program at any particular point in time. Similarly, the techniques used to reconstruct the control-flow graph also impact how much of the CFG can be reconstructed.

In various embodiments, the temporal execution profile for a DUA 110 may be created based on the known source code of the DUA 110. In some instances, however, the source code of the DUA 110 may not be accessible. In such embodiments, a firmware analysis system may be utilized to analyze the DUA 110 firmware prior to analysis by the monitoring system 100. A non-limiting example of a firmware analysis system that may be used is the Firmware Reverse Analysis Konsole ("FRAK") developed by Red Balloon Security. Nothing in this disclosure should be interpreted as limiting firmware analysis to only use of FRAK. A person of ordinary skill in the art would appreciate that any firmware analysis system that is capable of unpacking unknown firmware and producing timing data associated with operation of the DUA 110 is applicable.

In various embodiments, one or more temporal execution profiles may be created for each specific piece of code of the DUA 110. In various embodiments, each temporal execution profile may be a timing map, down to the instruction level of the code in question within nanosecond resolution. The generation of the temporal execution profiles may utilize processor-level simulation, hardware-assisted tracing facilities (e.g., Embedded Trace Macrocell ("ETM")), firmware analysis (e.g., FRAK), or a combination thereof.

As discussed above with respect to FIG. 1, the execution attestation engine 160 determines whether a specific block of code was executed. In various embodiments, this determination may be made based on each individual line of code (e.g., "x=coinflip( )"; "blinkLED(x)"; etc. of the example program 410). In some embodiments, the monitoring system 100 may not be capable of detecting analog emanations associated with each line of code. For example, assume that the monitoring system 100 is only capable of detecting the blink of an LED and the color (i.e., "blinkLED(x)"). The blink of the LED would be detected by one or more sensors of the sensing and processing component 140 and translated into a synchronization event by the synchronization event generator 130. The execution attestation engine 160 can analyze the synchronization event related to the blinking LED and confirm that the line of code "blinkLED(x)" executed. In various embodiments, the execution attestation engine 160 may make deductions about the value of the variables in the program (i.e., x; y), but cannot attest to execution of any other lines of code without further information.

Referring to FIG. 1, the EASE component 150 may include an integrity attestation engine 170. The integrity attestation engine 170 is responsible for validating that a host-based attestation computation was executed, and that the output from the host-based attestation computation reports no violation of an attested critical condition. In various embodiments, the integrity attestation engine 170 may be designed to analysis the synchronization events generated by the synchronization event generator 140 and ensure that an attacker has not changed the code of the DUA 110 by verifying that the detected value of a particular function induced within the DUA 100 is the same as the expected value. One non-limiting example of such an integrity attestation mechanism is disclosed in related, co-pending U.S. patent application Ser. No. 15/279,245, filed Sep. 28, 2016. In various embodiments, the integrity attestation engine 170 works with a host-based attestation mechanism, like Symbiotes, disclosed in "Defending Embedded Systems with Software Symbiotes," and developed by Red Balloon Security. Symbiotes are code structures that can be stealthily embedded into the firmware of a DUA 110. The execution of Symbiote structures is logically orthogonal to that of the host program, and causes predictable analog emanations because of its characteristic linear memory reads and checksum computations. In various embodiments, the integrity attestation engine 170 may be configured to work with secure-boot and/or signed code verification techniques.

The integrity attestation engine 170 can confirm that the integrity attestation mechanism (e.g., Symbiote; secure-boot; etc.) has executed. However, as the attestation mechanism cannot directly transmit information to the integrity attestation mechanism, no cryptographical confirmation that the attested critical condition has not been validated. That is, the integrity attestation engine 170 can confirm that security features (integrity attestation mechanisms) are running, but not that the outcome of the computation is correct.

The EASE component 150 may further include a control-flow reconstruction engine 180 in various embodiments. The control-flow reconstruction engine 180 creates a remote reconstruction of the actual control-flow executed on the DUA 110. In various embodiments, the control-flow may be reconstructed at the function level or the basic-block level. The control-flow reconstruction engine 180 may utilize a probabilistic control-flow reconstruction algorithm. Accurate control-flow reconstruction will enable real-time detection and post-exploitation analysis of a wide range of attacks. By combining available control-flow graph knowledge, temporal execution profiles of the monitored code, and observed synchronization events to reconstruct a probabilistic model of the control-flow being executed on the DUA 110.

Given a single synchronization event that indicates the execution of a specific point in a control flow graph ("CFG"), the control-flow of the monitored device can be probabilistically reconstructed in both temporal directions. In other words, given a single synchronization event, control-flow both immediately before and after the event can be probabilistically estimated. However, the confidence of the estimation will likely decrease exponentially with respect to the rate at which basic-blocks and functions are executed, which may or may not map linearly to time. Thus, the fidelity of the monitoring system's 100 control-flow reconstruction will depend on the nature and frequency of available synchronization events, which correspond directly to the type of code being executed on and the resource utilization level of the DUA 110.

Figure 5A:
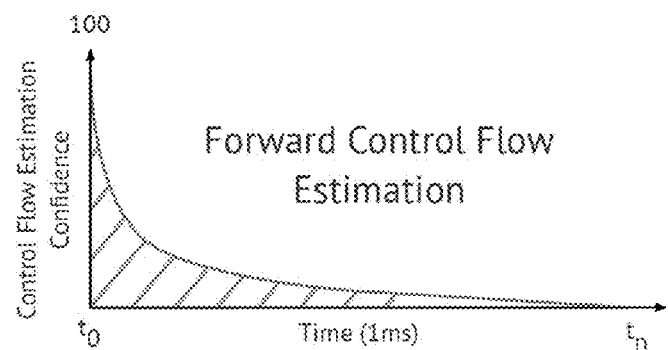
FIG. 5A shows a confidence level of a control-flow reconstruction using probabilistic forward estimation for a given synchronization event in accordance with various embodiments of the technology disclosed herein.
Figure 5B:
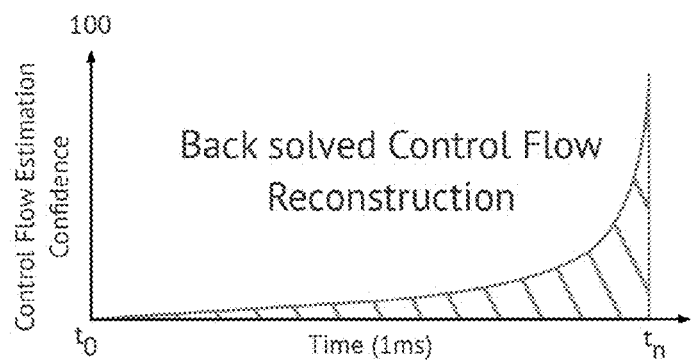
FIG. 5B shows a confidence level of a control-flow reconstruction using probabilistic back-solving for a given a synchronization event in accordance with various embodiments of the technology disclosed herein.

Given a synchronization event that indicates the certain execution of a point in a known CFG, FIG. 5A shows a confidence level of a control-flow reconstruction using probabilistic forward estimation alone. Forward estimation uses a CFG annotated with probabilities of execution and Bayesian inference to compute likely control-flow paths going forward in time. FIG. 5B shows that confidence level of the control-flow reconstruction using probabilistic back-solving, given the same synchronization event.

Figure 5C:
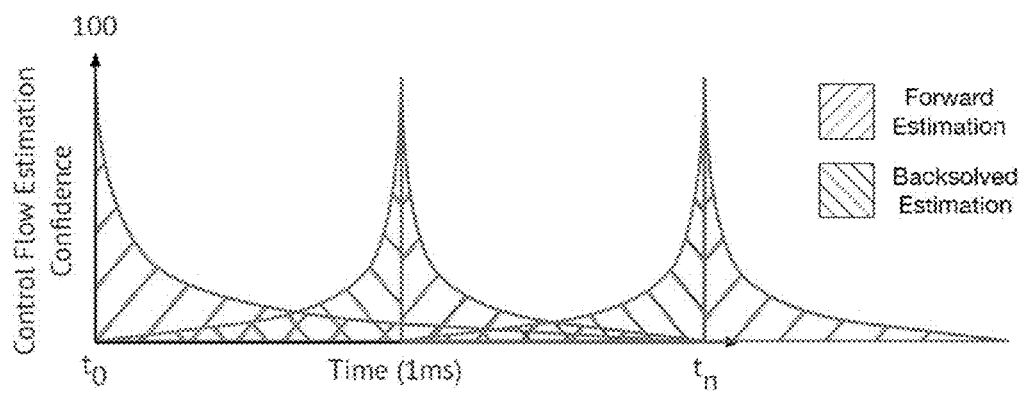
FIG. 5C illustrated a hybridized control-flow estimation approach over time, combining both forward estimating and back-solving of the same synchronization event in accordance with various embodiments of the technology disclosed herein.

With reference to FIGS. 5A and 5B, it is clear the confidence level of both approaches decay exponentially with each basic-block or function-level transition. By combining both methods, the maximum information recoverable for each synchronization event may be identified by simultaneously forward estimating and back-solving. FIG. 5C illustrated the hybridized control-flow estimation approach over time, combining both forward estimating and back-solving of the same synchronization event. Given a stream of such synchronization events, it is feasible to reconstruct portions of the DUA's 110 control-flow.

Each analysis engine of the EASE component 150 outputs an attestation determination. Attestation determinations may include execution attestation decisions, integrity attestation decisions, control-flow reconstructions, or any other analysis result. The attestation determinations are used by the security event generator 190 to check and generate security events when a violation or malicious event is detected.

sensing and processing component 140 In some cases, the firmware of the DUA 110 may be "boosted" to increase the fidelity of the synchronization events. The DUA 110 can by boosted by modifying critical code sections within the firmware to emit additional analog signals without changing the functionality of the firmware of the DUA 110. In various embodiments, boosted code may be injected into the firmware of the DUA 110. One non-limiting example is Funtenna, which is a software-only technique that causes intentional compromising emanation in modern computing hardware for the purpose of reliable data exfiltration. Funtenna is hardware agnostic, can operate within nearly all modern computer systems and embedded devices, and is specifically intended to operate within hardware not designed to act as RF transmitters.

Figure 7:
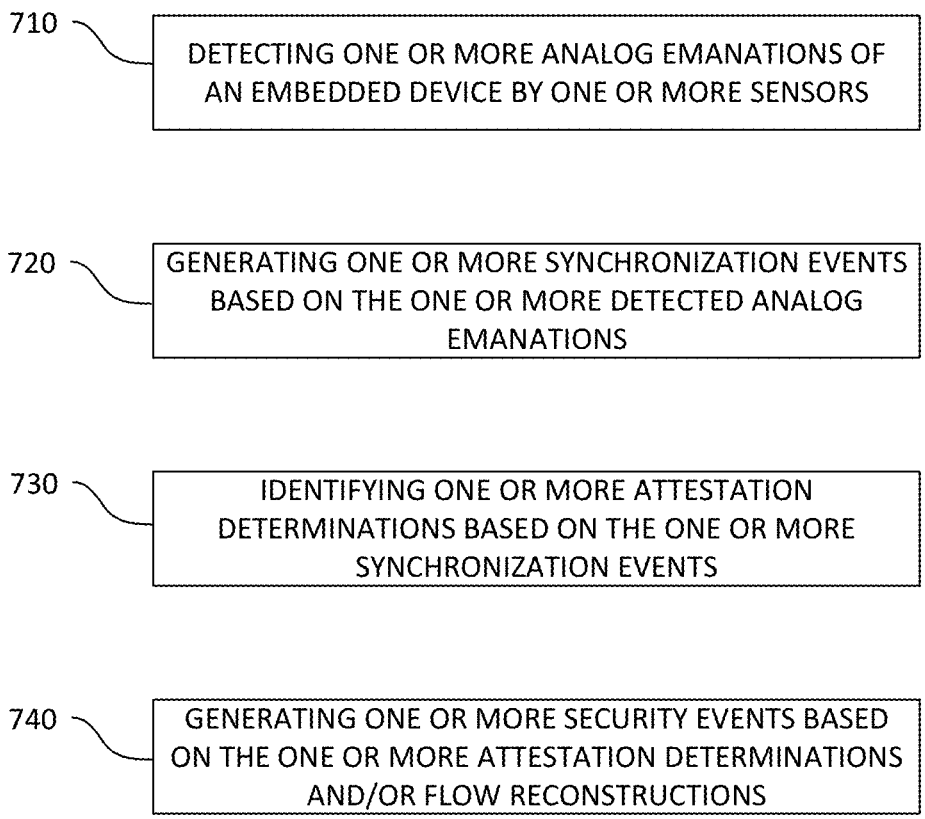
FIG. 7 illustrates an example method of security attestation in accordance with various embodiments of the technology disclosed herein.

Funtenna utilizes the common components of a special purpose computer system to generate, filter, amplify, and transmit information through a desired analog medium. FIG. 7 illustrates the path of data from a Funtenna payload to analog transmission in accordance with various embodiments of the technology disclosed herein. Funtenna signal generation is performed within the application processor or system on chip ("SoC") of a device to yield a time-varying signal at the input/output (I/O) pin for transmission. Funtenna signal generator software components exist for multiple I/O hardware devices such as analog GPIO, digital GPIO, and serial data outputs. An analog GPIO pin mapped to output allows as many output voltage states as permitted by the digital-to-analog ("DAC") converter within the processor. A more precise DAC means greater control over the shape of the output waveform. More complex modulation schemes can be devised for this type of output.

A digital GPIO pin mapped to output allows only one of two logic states to be generated by the processor—0 or 1, corresponding to low or high voltage. Because there are only two states allowed, all state transitions follow a step function. When these step functions are converted to RF electromagnetic energy, the power spectrum has the frequency distribution of a square wave. Data can be modulated onto this signal by either turning this square-wave output signal on and off (on-off-keying or OOK) or by changing the frequency of the square waveform to approximate frequency shift keying ("FSK").

Serial data output lines (such as UART, SPI, and I2C) allow for a square output signal much like digital GPIO. However, the hardware controller for these devices will often encode data for transmission and limit data rate. Thus, to generate a pure square wave for OOK or FSK data modulation, the protocol of the output bus must be reverse engineered to allow for arbitrary transmit messages. In many cases, this encoding scheme is simple and may only limit data rate.

After the Funtenna signal exits the SoC, it enters circuitry on the main board of the device. In various embodiments, the passive components within the output circuit may approximate a filter that attenuates or amplifies components of the Funtenna signal. For intended transmission in the RF spectrum, any component on the circuit prior to termination can serve as a radiating antenna. An ideal antenna is not expected or required in all transmission cases, as any non-shielded component may emit the desired electromagnetic signal if the signal's frequency components resonate within the medium. In many cases, this may be a wire between the on-board circuitry and an external component, such as a button. However, the Funtenna signal may influence the circuit in ways unintended by its designers, allowing for the utilization of more inventive RF transmitters within the target platform. For the transmission of data within the acoustic spectrum, the energy from the Funtenna signal is converted into sound by a sonic transducer. In a Funtenna implementation, a passive electronic component, such as an inductor or capacitor, or an actuator on the platform can serve as a sonic transducer.

Figure 6:
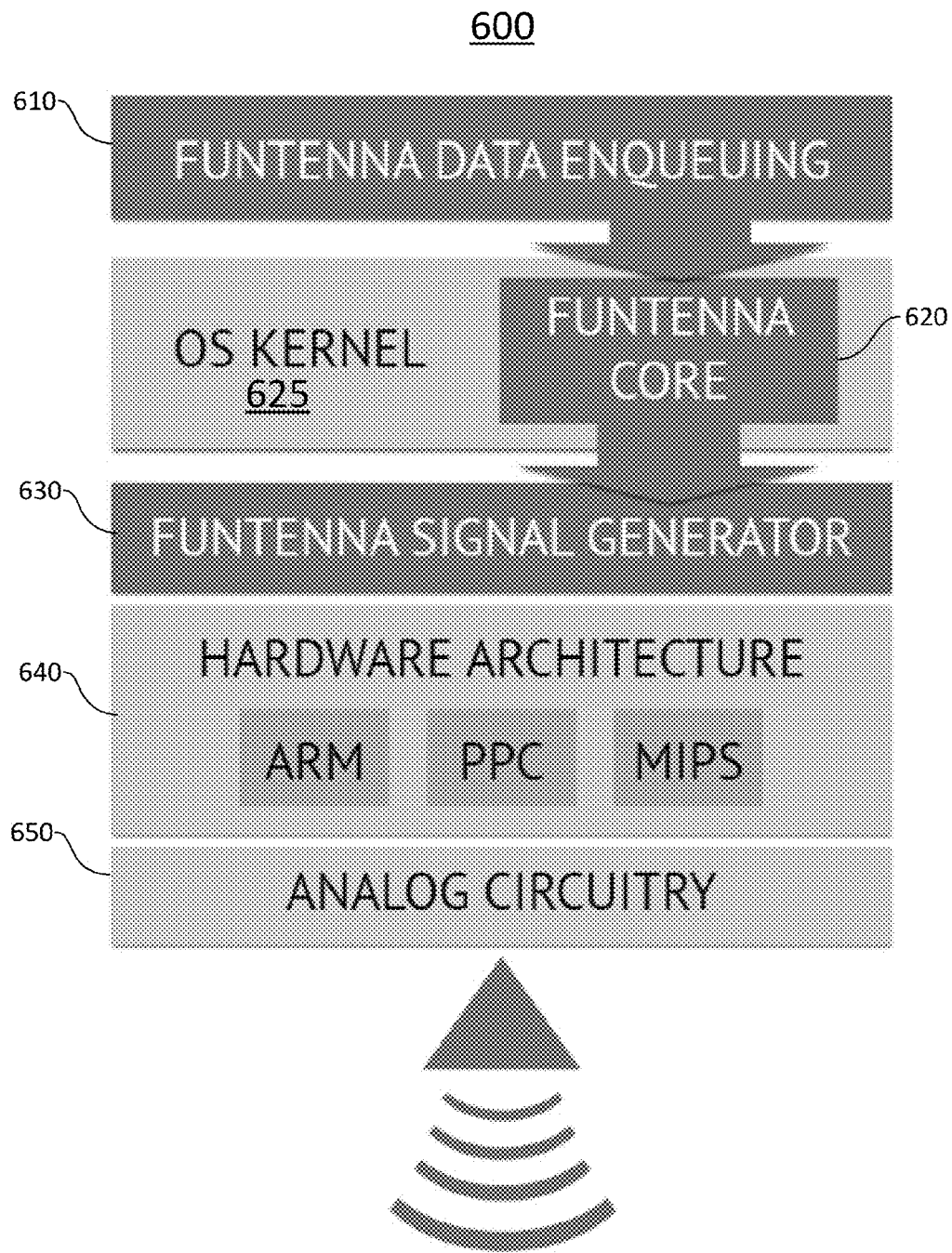
FIG. 6 illustrates an example framework of Funtenna in accordance with various embodiments of the technology disclosed herein.

FIG. 6 illustrates an example framework 600 of Funtenna in accordance with various embodiments of the technology disclosed herein. The Funtenna data enqueuing component 610 is a queued interprocess communication interface to transfer data between the kernel and the user space of modern embedded operating systems. In various embodiments, the data may be enqueued in either statically or dynamically allocated memory for exfiltration from the host operating system via Funtenna. In various embodiments, the Funtenna data enqueuing component 610 provides one or more application programming interfaces ("APIs") to host programs to pass messages to the Funtenna core 620 for transmission.

The Funtenna core 620 is loaded into the embedded operating system core 625. The Funtenna core 620 is responsible for encoding and encapsulating transmit messages. Specifically, the Funtenna core 620 turns data into frames of a defined structure that aids synchronization during signal reception. In various embodiments, the Funtenna core 620 may implement lightweight error correction coding to overcome bit errors.

The Funtenna signal generator 630 interfaces directly with the SoC hardware controllers to turn the data frames from the Funtenna core 620 into an analog waveform. The Funtenna signal generator 630 modulates the bit stream using the designated hardware interface. In various embodiments, more than one Funtenna signal generator 630 may be included within a DUA 110. Each Funtenna signal generator 630 must be matched with a hardware interface 640 and output circuit 650 to maximize transmission gain. This matching is important to verify the desired output frequency components from the SoC will be filtered correctly in the circuit and then radiate correctly in the antenna.

With boosted firmware, the analysis engines of the EASE component 150 of FIG. 1 can provide additional benefits. For example, assume that a 1-bit Funtenna transmitter is injected into the beginning of each function of the example program discussed with respect to FIG. 4A. The execution attestation engine 160 can use the data emitted from the Funtenna transmitter to perform additional execution attestation. Given the temporal execution profile 420 of the example program 410 and the 1-bit signal at the beginning of each function of a program, execution attestation of all the function calls in the example program 410, unlike the non-boosted version discussed above (where only the "blinkLED(x)" call is attestable).

Where boosted firmware is utilized with the integrity attestation engine 170, the output of existing DUA 110 security features can be transmitted directly to the monitoring system 100. For example, assume that a 32-bit Funtenna transmitter is present. Using the 32-bit transmitter, a cryptographically protected stream of a host-based attestation mechanism (i.e., Symbiote) can be sent to the monitoring system 100. With this additional information, the integrity attestation engine 170 is capable of confirming not only that the attestation mechanism is running, but also that the monitored critical condition has not been violated. A 32-bit Funtenna transmitter injected at the beginning of each function of a program further enables enhancement of the fidelity of control-flow reconstruction down to the basic-block level.

FIG. 7 illustrates an example method 700 of security attestation in accordance with various embodiments of the technology disclosed herein. At 710, one or more sensors of a monitoring system detects one or more analog emanations of an embedded device. The detection of the analog emanations is similar to the detection with respect to the sensing and processing component 140 discussed above with respect to FIG. 1. At 720, one or more synchronization events are generated by a synchronization event generator. The synchronization events are determined based on the analog emanations emitted by an operating embedded device.

At 730, one or more attestation determinations based on the one or more synchronization events are identified. The identification may be done by the EASE component 150 discussed above with respect to FIG. 1. At 740, one or more security events may be generated based on the one or more attestation determinations. The method 700 discussed above may perform in the same manner as the system discussed above with respect to FIG. 1.

The term tool can be used to refer to any apparatus configured to perform a recited function. For example, tools can include a collection of one or more components and can also be comprised of hardware, software or a combination thereof. Thus, for example, a tool can be a collection of one or more software components, hardware components, software/hardware components or any combination or permutation thereof. As another example, a tool can be a computing device or other appliance on which software runs or in which hardware is implemented.

As used herein, the term component might describe a given unit of functionality that can be performed in accordance with one or more embodiments of the technology disclosed herein. As used herein, a component might be implemented utilizing any form of hardware, software, or a combination thereof. For example, one or more processors, controllers, ASICs, PLAs, PALs, CPLDs, FPGAs, sensors, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent component names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system, comprising:
   a sensing component configured to detect a plurality of analog emanations from one or more components of an embedded device, an analog emanation comprising an analog signal associated with execution of a function of the embedded device;
   a synchronization event generator configured to generate one or more synchronization events based on one or more analog emanations detected by the sensing component, a synchronization event identifies one or more functions of the embedded device associated with the one or more analog emanations detected;
   an event analysis and state estimation component configured to analyze one or more synchronization events generated by the synchronization event generator; and generate one or more attestation determinations; and
   a security event generator configured to generate one or more security events based on one or more attestation determinations outputted by the event analysis and state estimation component.

2. The system of claim 1, the sensing component comprising one or more of: single-mode sensor; multi-mode sensor; or a combination thereof.

3. The system of claim 2, wherein the single-mode sensor is configured to detect one of: sub-acoustic signals; acoustic signals; ultrasonic signals; electromagnetic radiation; visual signals; thermal energy; or electric power variations.

4. The system of claim 2, wherein the multi-mode sensor is configured to detect one or more of: sub-acoustic signals; acoustic signals; ultrasonic signals; electromagnetic radiation; visual signals; thermal energy; or electric power variations.

5. The system of claim 1, the event analysis and state estimation component comprising one or more analysis engines.

6. The system of claim 5, wherein the one or more analysis engines comprise an execution attestation engine, an integrity attestation engine, a control-flow reconstruction engine, or a combination thereof.

7. The system of claim 1, wherein the event analysis and state estimation component is configured to work with boosted embedded device firmware, non-boosted embedded device firmware, or a combination thereof.

8. The system of claim 7, wherein the boosted embedded device firmware comprises one or more Funtenna software structures injected into an initial firmware of an embedded device.

9. The system of claim 8, wherein Funtenna software structures are injected software code designed to generate additional analog signal associated with an instruction of a program of the embedded device, the additional analog signals emitted by one or more passive circuit components of the embedded device.

10. A method of security protection of embedded devices, comprising:
    detecting, by one or more sensors of a monitoring system, one or more analog emanations of an operating embedded device, an analog emanation comprising an analog signal associated with execution of a function of the operating embedded device;
    generating one or more synchronization events by a synchronization event generator, a synchronization event identifies one or more functions of the operating embedded device associated with the one or more analog emanations detected;
    identifying one or more attestation determinations based on the one or more synchronization events; and
    generating one or more security events based on the one or more attestation determinations.

11. The method of claim 10, wherein the one or more sensors comprises one or more of: single-mode sensor; multi-mode sensor; or a combination thereof.

12. The method of claim 10, wherein the single-mode sensor is configured to detect one of: sub-acoustic signals; acoustic signals; ultrasonic signals; electromagnetic radiation; visual signals; thermal energy; or electric power variations.

13. The method of claim 10, wherein the multi-mode sensor is configured to detect one or more of: sub-acoustic signals; acoustic signals; ultrasonic signals; electromagnetic radiation; visual signals; thermal energy; or electric power variations.

14. The method of claim 10, wherein identifying one or more attestation determinations comprises analyzing the one or more synchronization events by one or more analysis engines.

15. The method of claim 14, wherein the one or more analysis engines comprise an execution attestation engine, an integrity attestation engine, a control-flow reconstruction engine, or a combination thereof.

16. The method of claim 10, further comprising booting the operating embedded device to increase analog emanations from the operating embedded device.

17. The method of claim 16, boosting the operating embedded device comprising injecting one or more Funtenna software structures into an initial firmware of the embedded device.

18. The method of claim 17, wherein Funtenna software structures are injected software code designed to generate additional analog signals associated with an instruction of a program of the embedded device, the additional analog signals emitted by one or more passive circuit components of the embedded device.

* * * * *